United States Patent [19]
Vassilev

[11] 3,765,186
[45] Oct. 16, 1973

[54] METHOD AND APPARATUS FOR PRODUCING SUPER-LOW TEMPERATURES

[75] Inventor: Petko Gueorguiev Vassilev, Sofia, Bulgaria

[73] Assignee: Fizitcheski Institut S Aneb Pri Ban, Sofia, Bulgaria

[22] Filed: June 14, 1972

[21] Appl. No.: 262,670

Related U.S. Application Data

[63] Continuation-in-part of Ser. No. 122,106, March 8, 1971, abandoned, which is a continuation-in-part of Ser. No. 834,617, June 17, 1969, abandoned.

[30] Foreign Application Priority Data
June 19, 1968 Bulgaria .............................. 10164

[52] U.S. Cl. ............................................ 62/3, 165/1
[51] Int. Cl. .............................................. F25b 21/02
[58] Field of Search ................................ 62/3; 165/1

[56] References Cited
UNITED STATES PATENTS
3,108,444 10/1963 Kahn ........................................ 62/3
3,393,526 7/1968 Pearl ........................................ 62/3

Primary Examiner—William E. Wayner
Attorney—Arthur O. Klein

[57] ABSTRACT

A method and apparatus for producing stable super-low temperatures in a test object for laboratory purposes is described. Three different elongated superconductive elements are bonded end-to-end to form a composite rod. One end of the resulting superconductive rod is placed in good thermal contact with a reservoir containing liquid helium, while the other end of the rod is placed in good thermal contact with the object to be cooled. Each element of the rod is separately subjected under adiabatic conditions to a discrete magnetic field within a separate compartment of a surrounding superconductive shield to trigger a change of the associated element from its superconductive to its normal state with a corresponding drop in temperature. Because of the diamagnetism of the shield, the applied magnetic fields are mutually isolated, and the changes in state of each element are independent of those of the other elements. Such changes in state are discretely triggered in an appropriate sequence to transfer accumulated heat from the test object to the reservoir.

5 Claims, 7 Drawing Figures

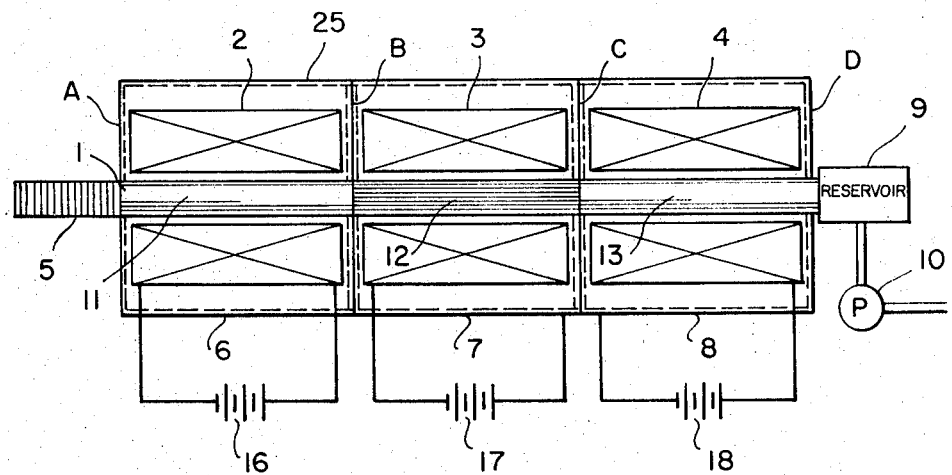
FIG. 1
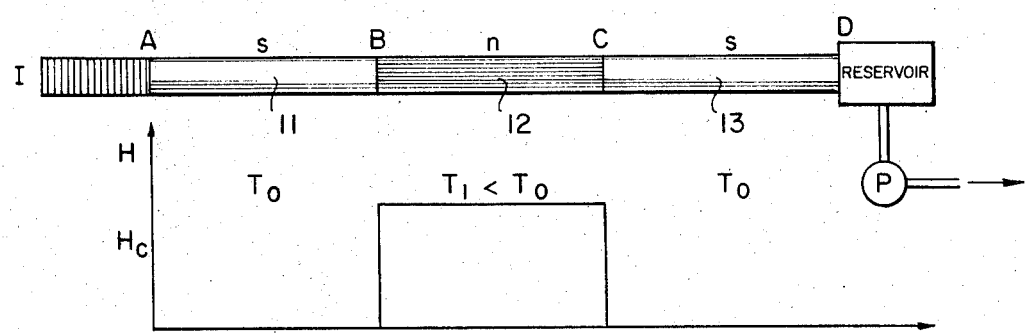
FIG. 2A
FIG. 2B

FIG. 3A
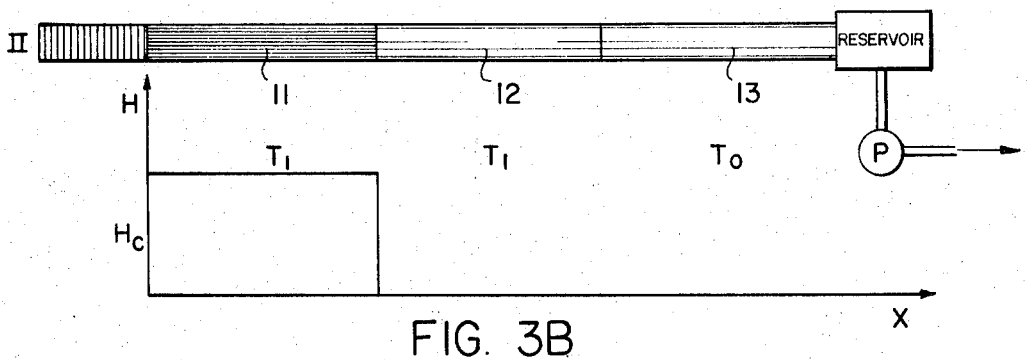
FIG. 3B
FIG. 4A
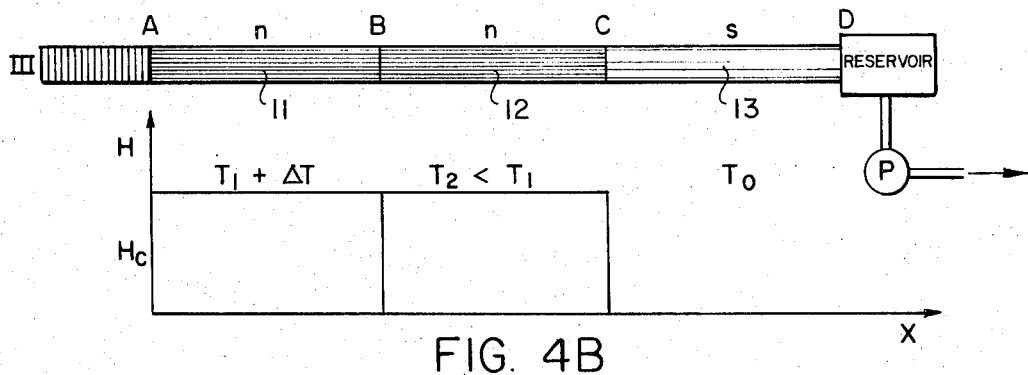
FIG. 4B

METHOD AND APPARATUS FOR PRODUCING SUPER-LOW TEMPERATURES

CROSS-REFERENCE TO RELATED APPLICATIONS

This application is a continuation-in-part of application Ser. No. 122,106, filed Mar. 8, 1971, now abandoned. The last-mentioned application, in turn, is a continuation-in-part of application Ser. No. 834,617, filed June 17, 1969, now abandoned.

BACKGROUND OF THE INVENTION

The present invention relates to a method and apparatus for producing stable, super-low temperatures in a test object for laboratory purposes.

Many presently employed cooling cycles for obtaining super-low temperature levels are based on the principle that the entropy of a substance when in a superconducting state is lower than its entropy at its same temperature when in a normal state. Consequently, if at a given temperature lower than a critical temperature for a given superconductive material, such material passes into a normal state in an adiabatic way, its temperature should drop. Such transition may be accomplished, for example, by applying to the material a sufficiently high magnetic field.

One such technique is disclosed in J. PEARL U.S. Pat. No. 3,393,526, issued July 23, 1968. In this arrangement, a superconductive rod interconnects the object to be cooled with a helium reservoir maintained at a desired low temperature, with the rod making good thermal contact with the object and the reservoir. A magnetic field sufficient to trigger the rod into a normal state under adiabatic conditions is applied across the rod.

A disadvantage of this arrangement is that because of the resultant magnetic field gradient along the rod, the transition between the superconductive and normal states along the rod in response to the applied magnetic field is not sharp, and a portion of the rod typically exhibits an intermediate or mixed state due to its microscopic structure. The presence of this mixed zone, in turn, causes considerable energy dissipation which reduces the desired cooling effect on the test object, and in certain cases can even eliminate it entirely.

SUMMARY OF THE INVENTION

An improved technique which is adapted to produce stable super-low temperatures in the test object and which avoids the above-mentioned disadvantage is provided by the apparatus and method of the invention.

In one illustrative arrangement, the superconductive structure includes first, second, and third different elongated superconductive elements conductively joined end-to-end with the first element being nearest the test object. A separate electromagnet surrounds each element, and each such electromagnet is in turn surrounded by a separate, magnetically isolated compartment of a closed diamagnetic shield. With this arrangement, the suitable energizing of each electromagnet will switch only the associated element into its normal state.

In order to establish the required stable cooling of the test object with this improved arrangement, a three-phase cycle of energization of the electromagnets is instituted. In the first phase, the second electromagnet is energized to switch the associated element into its normal state while the first and third elements are maintained superconductive. In the second phase, the second electromagnet is de-energized and the first electromagnet is energized to switch the first element into its normal state. In the third phase, both the first and the second electromagnets are energized, wherein accumulated heat from the test object is transferred through the first element and stored in the second element. During these phases, the third element remains in its superconductive state so that its heat transfer capability remains low.

After several such three-phase cycles, the accumulated heat on the second element may be transferred to the reservoir by energizing the third electromagnet to switch the third element into its normal state.

BRIEF DESCRIPTION OF THE DRAWING

The invention will be further described in connection with the following detailed description taken in conjunction with the appended drawing, in which:

FIG. 1 is a schematic representation of an arrangement for maintaining a stable super-low temperature in a test object in accordance with the invention wherein first, second, and third magnetically isolated superconductive elements are joined end-to-end to form a composite rod that interconnects the test object with a reservoir of liquid helium;

FIG. 2A is a schematic representation of a portion of the arrangement of FIG. 1, wherein the second element is in its normal state and the other elements are in their superconductive states;

FIG. 2B is a graph of the magnetic field and temperature conditions existing along the rod in the arrangement of FIG. 2A;

FIG. 3A is a schematic representation similar to FIG. 2A but with the first element shown in its normal state and the other elements in their superconductive states;

FIG. 3B is a graph of the magnetic field and temperature conditions existing along the rod in the arrangement of FIG. 3A;

FIG. 4A is a schematic representation similar to FIGS. 2A and 3A but with the first and second elements shown in their normal states and the third element in its superconductive state; and FIG. 4B is a graph of the magnetic field and temperature conditions existing along the rod in the arrangement of FIG. 4A.

BRIEF DESCRIPTION

Referring now to FIG. 1, the numeral 1 represents a composite superconductive rod including three different, elongated superconductive elements 11, 12 and 13. The elements 11, 12 and 13 are conductively bonded end-to-end as by soldering, brazing, or the like.

The rod 1 is thermally isolated from its surroundings in a conventional manner so that adiabatic conditions are maintained, with each of the elements 11, 12 and 13, being initially in its superconductive state.

One end of the rod 1 is in good thermal contact with a reservoir 9 containing liquid helium, whose vapors are pumped out via a pump 10 in order to maintain a desired starting temperature $T_0$. The temperature $T_0$ may be selected to be higher than the critical temperature of each of the elements 11, 12 and 13. The other end of the rod 1 is in good thermal contact with a test object 5 to be cooled.

The elements 11, 12 and 13 are individually surrounded by three associated electromagnets 2, 3 and 4 which are arranged to be individually excited by DC sources 16, 17 and 18 through suitable switches not shown. Each electromagnet may be separately excited to apply, to its associated element, a magnetic field which exceeds the critical magnetic field of such element by an amount sufficient to switch the element from its initial superconductive state to a normal state. Because of the adiabatic operating conditions of the rod 1, a switching of states from superconductive to normal in each element results both in a lowering of the temperature of such element and an increase of its heat transmission capability.

In accordance with the invention, a superconductive shield 25 is provided to localize the magnetic field applied by each of the electromagnets 2, 3 and 4 to the associated element so that each element is magnetically isolated from the others. This technique avoids the energy-wasting mixed state along the rod as observed in prior-art arrangements.

The shield 25 had end walls A and D and is divided by intermediate walls B and C into three compartments 6, 7 and 8. The respective compartments individually surround the electromagnets 2, 3 and 4 and the associated elements 11, 12 and 13 as shown. The superconductive material of the shield 25 (including walls A, B, C and D) has a high critical magnetic field and preferably comprises niobium, lanthanum or technetium.

As is well known, such a superconductive material makes an excellent shield for magnetic fields because of its near-perfect diamagnetism. [See, e.g., Bremer, *Superconductive Devices*, page 151 (McGraww-Hill, 1962)]. As in any diamagnetic material, the flux lines at any affected surface of the superconductive shield 25 are parallel to the surface. This is due to the well-known Meissner effect, by which a superconductor is impermeable to a magnetic field applied thereto except in a small penetration region near the surface. In such region, currents flow to balance the applied field and make the total field vanish throughout the interior of the superconductor. Since the thickness of this penetration region is generally only about 500A, the compartments 6, 7 and 8 and thereby the contained elements 11, 12 and 13 are effectively isolated magnetically from each other.

In general, the elements 11, 12 and 13 are of different materials and geometrical dimensions chosen to create optimum cooling conditions. As an illustration, Table 1 below sets forth the materials and geometric dimensions of a typical set of elements 11, 12 and 13 in the composite rod 1, together with typical values of magnetic fields applied through the associated electromagnets to switch the respective elements into their normal states:

TABLE 1

| Element No. | Material | Length (cm) | Cross-section (cm$^2$) | Applied Magnetic Field (oersteds) |
|---|---|---|---|---|
| 11 | tin | 8 | 10$^{-2}$ | 310 |
| 12 | lead | 10 | 10 | 805 |
| 13 | titanium | 9 | 4×10$^{-3}$ | 105 |

It will be appreciated that the object 5 is substantially isolated from the reservoir 9 when each of the intervening elements 11, 12 and 13 is in its superconductive state because of the relatively low heat transmission capacity of the elements in such state. Consequently, in order to initially establish in the object 5 a desired low temperature $T_o$, each of the electromagnets 2, 3 and 4 may be simultaneously energized so that each of the associated elements 11, 12 and 13 are switched into their normal state. The resulting increase in heat transmission capacity along the entire rod 1 serves to equalize the temperature of the reservoir and the object after which the electromagnets may be deenergized to again thermally isolate the object from the reservoir. At this point, the elements 11, 12 and 13 are again in their superconductive states with the system in equilibrium at the temperature $T_o$.

In order to effectively maintain the object 5 at such a low temperature, three successive phases of a typical cooling cycle in accordance with the invention are now executed as depicted in FIGS. 2-4.

In the first phase, only the electromagnet 3 (FIG. 1) is energized to switch the element 12 into its normal state by applying to such element a magnetic field greater than its critical field Hc, as represented in FIG. 2A. As a result, the elements 11 and 13 remain in a superconducting state at the temperature $T_o$, while the element 12 is now in its normal state at a temperature $T_1 < T_o$ (see FIG. 2B). Such reduction in temperature results from the transition of the element 12 under adiabatic conditions from the superconductive state to the normal state at the initial temperature $T_o$.

In the next phase, the electromagnet 2 (FIG. 1) is energized and the electromagnet 3 is deenergized. The element 11 is thereby switched into its normal state (FIG. 3A). The temperature of the element 11 is now also lowered to about $T_1$ (see FIG. 3B) since in general the elements 11 and 12 will have an almost equal difference in entropy between their normal and their superconductive states. (In addition, the effective localizing of the magnetic fields individually applied to the elements 11 and 12 permits their critical magnetic fields to be selected within similar ranges.) Because of the high thermal conductivity of the element 11 in its normal state, the temperature of the object 5 tends to equalize with that of the element 11.

In the third phase of the cycle, the electromagnet 3 (FIG. 1) is again energized while the electromagnet 2 is maintained energized, so that the elements 11 and 12 are both now in their normal states. In this case, the temperature of the now-switched element 12 is reduced from the value $T_1$ established in the second phase to a lower value $T_2$ (FIG. 4B). The element 13, as before, remains in a superconducting state and serves as a thermal switch between the reservoir 9 and the object 5.

This 3-phase cycle can be repeated several times in succession, with the inevitable heat generated in the object 5 (due, e.g. to the introduction of energy thereto from outside the system depicted in FIG. 1) being removed during each second and third phase and effectively stored in the element 12. In order to transfer such accumulated heat from the element 12 to the object 5 after a number of successive three-phase cycles, the element 13 may be switched into its normal state through the energizing of the electromagnet 4.

The duration of each phase of the cycle depends in general on the relaxation time and the geometrical dimensions of the superconducting elements 11, 12 and 13.

In the foregoing, the invention has been described in connection with a preferred arrangement thereof.

Many variations and modifications will now occur to those skilled in the art. Accordingly, it is desired that the scope of the appended claims not be limited to the specific disclosure herein contained.

What is claimed is:

1. In a system for producing super-low temperatures in a test object wherein the system comprises thermally isolated, elongated superconductive means having one end thereof adapted for good thermal contact with the test object and the other end thereof adapted for good thermal contact with a reservoir maintained at a desired temperature, and means for selectively applying to the superconductive means a magnetic field of such a magnitude as to switch at least a portion of the superconductive means from a superconductive to a normal state, the improvement wherein:

the superconductive means comprises a plurality of different elongated superconductive elements joined end-to-end;

the applying means comprises a plurality of separately excitable electromagnets individually surrounding the elements; and the system further comprises means for magnetically isolating each of the elements and its associated electromagnet from the other elements and electromagnets.

2. A system as defined in claim 1, in which the isolating means comprises a closed superconductive shield having a plurality of magnetically isolated compartments individually surrounding the electromagnets.

3. A system as defined in claim 1, in which the reservoir contains liquid helium, and in which the system further comprises means for pumping helium vapor out of the reservoir.

4. In a method for producing super-low temperatures in a test object, the steps of:

placing, in good thermal contact with the test object, one end of a composite, superconductive rod formed from first, second and third magnetically isolated elements initially in a superconductive state, said one end being associated with the first element;

placing the other end of the composite rod in good thermal contact with a reservoir maintained at a desired temperature, said other end being associated with the third element;

locally applying to the second element a magnetic field sufficient to switch the second element into its normal state;

thereafter locally applying to the first element a magnetic field sufficient to switch the first element into its normal state and removing the magnetic field from the second element; and thereafter again locally applying to the second element a magnetic field sufficient to switch the second element into its normal state.

5. A method as defined in claim 4, further comprising the step of locally applying to the third element a magnetic field sufficient to switch the third element into its normal state.

* * * * *